(12) United States Patent
Zhang

(10) Patent No.: US 11,033,001 B2
(45) Date of Patent: Jun. 15, 2021

(54) AUTOMATIC DOG WASHING AND BRUSHING MACHINE

(71) Applicant: Weijian Zhang, Irvine, CA (US)

(72) Inventor: Weijian Zhang, Irvine, CA (US)

( * ) Notice: Subject to any disclaimer, the term of this patent is extended or adjusted under 35 U.S.C. 154(b) by 235 days.

(21) Appl. No.: 16/403,525

(22) Filed: May 4, 2019

(65) Prior Publication Data
US 2020/0170220 A1    Jun. 4, 2020

Related U.S. Application Data

(60) Provisional application No. 62/774,286, filed on Dec. 2, 2018.

(51) Int. Cl.
*A01K 13/00*    (2006.01)

(52) U.S. Cl.
CPC .................. *A01K 13/001* (2013.01)

(58) Field of Classification Search
CPC ...... A61D 11/00; A01K 13/001; A01K 13/00; A01K 13/003; A01K 13/004; A45D 19/026; A45D 24/10; A45D 24/16; A46B 2200/10; A46B 2200/1093; A46B 13/02
USPC ....... 119/665, 664, 600, 602, 603, 604, 608, 119/609, 611, 612, 652, 662, 671, 673, 119/676, 516, 518, 536; 623/664, 665
See application file for complete search history.

(56) References Cited

U.S. PATENT DOCUMENTS

| | | | | |
|---|---|---|---|---|
| 3,823,356 A * | 7/1974 | Paavola | ................ | B60S 3/06 |
| | | | | 318/39 |
| 3,884,191 A * | 5/1975 | Stout | ................ | A01K 13/001 |
| | | | | 119/671 |
| 4,020,796 A * | 5/1977 | Grifa | ................ | A01K 13/001 |
| | | | | 119/671 |
| 4,083,328 A * | 4/1978 | Baker | ................ | A01K 13/001 |
| | | | | 119/673 |
| 4,549,502 A * | 10/1985 | Namdari | ............ | A01K 13/001 |
| | | | | 119/664 |
| 5,448,966 A * | 9/1995 | McKinnon | ........ | A01K 13/001 |
| | | | | 119/676 |
| 10,426,139 B1 * | 10/2019 | Hill | ................ | A01K 13/001 |
| 2003/0196608 A1 * | 10/2003 | Lee | ................ | A01K 13/001 |
| | | | | 119/651 |
| 2015/0366163 A1 * | 12/2015 | Carter | ............ | A01K 13/001 |
| | | | | 119/678 |
| 2017/0094939 A1 * | 4/2017 | Wright | ............ | A01K 13/001 |

* cited by examiner

*Primary Examiner* — Justin M Jonaitis

(57) ABSTRACT

An automatic wet washing and dry brushing apparatus for dogs comprises an elongated container, a tub placed inside the container at one end, a movable brush panel on each side of the tub and a mechanical device that drives the brush panels. The mechanical device is installed in the space between the container walls and the tub walls. The tub has two sidewalls, a floor with a drain, and a door at one end. Each brush panel is suspended on a sidewall and supported by a rail affixed inside the sidewall through a slot on the sidewall. The brush panels are used to brush a dog by sliding in a reciprocating motion. The brushes are made of spaced long and flexible bristles that accommodate the dog's body shape. The tub is equipped with water sprayers and a drain system. The container is movable with 4 wheels.

11 Claims, 2 Drawing Sheets

AUTOMATIC DOG WASHING AND BRUSHING MACHINE

FIELD OF THE INVENTION

This invention relates to an automatic pet washing and brushing machine including a bathtub, automatically slidable brushes and water sprayers for dry brushing or wet washing pet animals, in particular dogs.

BACKGROUND OF THE INVENTION

Owing pets is a part of our culture in our society. A pet such as a dog provides us, human, with friendship and companionship. However, owing a pet is not a trivial task. For an example, we need to walk a dog daily and groom and wash it regularly to keep it clean and healthy. A dog owner may take his/her dog to a grooming store to groom and wash the dog. The professional groomers use industrial size dog washing tubs equipped with water sprayers and manually brush and rinse the dog. Although large and versatile, these professional bathtubs are made of stainless steel and are very heavy and expensive. The increasing costs for the labor, equipment and store space make dog washing more and more expensive. During the washing the pet owner either wait at the store or come back to pick up the dog when the process is complete. This practice not only costs money and adds stress to our busy daily schedules. Some other dog owners choose to wash their dog themselves at home, in a yard with a garden hose or in a shower or a tub by hand. It is, however, tedious and messy because you need to scrub by your fingers or brush with a brush the whole body of the dog, rinse, and at the same time control the dog in the place, especially when the dog has long hair or a thick fur. Outside washing is limited to a warm weather and a good draining ground. Grooming is another aspect of keeping a dog's hair clean and healthy. It also takes time and effort to brush around the body of a dog.

Many attempts have been made to design and provide dog-washing apparatuses with less stressful labor requirement and better cleaning efficiency. Generally there are three types of designs: the open top bathtubs with water sprayers and a door designed for a groomer to hand scrub and rinse a dog, such as U.S. Pat. No. 5,794,570 and enclosures equipped with spraying heads, which spray water to clean an animal or blow air to dry it, such as U.S. Pat. No. 5,448,966. However, these patents are limited to cleaning an animal by water spraying, without brushing. Lastly, Namdari disclosed an apparatus for washing animals, U.S. Pat. No. 4,549,502. The patent describes motor driven rotary brushes and brushes fixed on rods and frames, which are slightly movable by pulleys. To cover the whole body of an animal the apparatus uses a plurality of brushes on a plurality of rods and frames. However, the full body contact and brushing action would create a strong pushing and pulling forces on the animal. This brushing action would require multiple high power motors, which is dangerous to an animal. In addition, the force of the full body brushing would destabilize and terrify an animal. This invention with brush panels on slide rails overcomes these problems by utilizing narrow brushes, which move in a length of an animal's whole body. The brushing movement orbit and length can be altered by modifying the slide rails or tracks according to the animal's body size and shape. The small contact areas would cause much less friction and will not move the animal. In addition, this invention uses brushes with long and flexible bristles, which render a soft and gentle scrubbing action.

Dogs, especially those with thick furs or long hairs, need to be brushed regularly to remove dead or excessive hairs; otherwise, the hairs may be tangled and become chunky, which are ugly and unhealthy. However, manually brushing and combing a dog's hair is time consuming, which is more tedious when the dog is big. Devices for automatically brushing animals are known in prior art, being mainly rotary roller brushes driven by a motor, for big animals like cattle to scratch coat, such as the brushing device disclosed by van der Poel, U.S. Pat. No. 7,481,184 B2. However, they are not useful with domestic pets with furs.

It is apparent that all these disclosed inventions have limitations and disadvantages, such as low cleaning efficiency due to lack of brushing or limited washing areas. Some inventions attempt to overcome these limitations by using all known means. However, animals, especially pets are nervous and movable in a washing enclosure. Any projected showerheads or brush heads would obtrude the animal's movement in the washing enclosure and cause injury. Those designs also make the devices very complex and difficult to manufacture, not mentioning commercially affordability.

The present invention overcomes these problems and disadvantages by proving a novel automatic pet brushing/washing machine which is efficient, simple to manufacture, safe to animals and affordable to pet owners. It will be very desirable if a dog owner owns a dog washing machine, which is economical and easy to use, can wet wash and dry brush a dog automatically at home.

SUMMARY OF THE INVENTION

In accordance with the present invention, an automatic washing and brushing apparatus for a pet, especially, for a pet dog is disclosed. The apparatus comprises 1) a bathtub in a container for containing and washing a dog and storing wastewater under a floor with a drain, 2) two sets of brush panels suspended on and movable along the two tub sidewalls, 3) two tracks consisting of two slide rails and rail supports positioned inside the sidewall panels adjacent to the top edges of the tub, 4) two or more sliders capable of sliding on the slide rails and supporting the brush panels, 5) two sidewall panels as the sidewall of the tub, each having a longitudinal slot for the movement of the longitudinally movable sliders, 6) a mechanical device which provides reciprocating movement to the sliders, 7) a water spray system consisting of a water pump, tubings and sprayers, 8) a drain system including a floor drain, an outlet drain and a drain pump in the wastewater compartment, 9) a control system including switches, sensors, motor drivers and controllers for the control of the motor and the water pumps.

The design features of the brush panel and sliding mechanism are important for reducing brushing resistance and mechanical noise. With the reciprocating sliding and a full length movement, a brush panel on wheels would tend to derail and rattle. With this knowledge, the improvement of a suspended brush panel on a rail, which is fixed above the floor, is to be appreciated. Each bush panel is attached to one or two sliders, which are, preferably, ball bearing blocks making the movement smooth and quite with minimum resistance. To further reduce the friction between a moving brush panel and the sidewall panel, two sliding wheels are installed in the space.

The size and shape of brushes panels are selected to fit the dog's body shape and height. The material, diameter and length of the bristles are selected based on a dog's fur and length of hair. The brushes panels, according to this invention, are devised to travel from the front to the back of an animal. The brush bristles are arranged in stripes and spaced thus to reduce the resistance of brushing movement.

A dog on leash is to be led into the tub through an opening. The door is closed and the dog is restrained in the tub by securing the leash on a handle on the front tub wall. On the tub outer wall a water reservoir is attached to the tub. An operator adds shampoo and water to the water reservoir and mix them. The operator then pushes the brushing switch to start the automatic brushing and the spray switch to spray the shampoo solution to the dog. Because the spray tubings are deployed on the top of the moving brush panels, the shampoo solution is evenly distributed to the dog's body. After the shampoo solution is almost consumed clean warm water is poured into the reservoir. The dog is rinsed with the brushing on. The operator may use a soft brush such one with long microfibers to brush the dog's delicate face. If the dog tries to shake off water, the tall brush panels will catch the most of the water. When the rinsing is complete, the operator opens the door and the dog is released from the handle and led out of the tub. The operator then towel dry and air dry the dog.

The apparatus uses a simple mechanical mechanism to drive the brush panels in a reciprocating movement for brushing. Preferably, the rotatory force of a motor is converted to a reciprocating movement of the brush panels by using a slider-crank mechanism or similar mechanical mechanisms such as Scott York mechanism and quick return mechanism. Optionally, a motor with pulleys and a timing belt can drive a slider back and forward automatically controlled by a motor driver and a controller.

It is an object of the present invention to provide an automatic pet, particularly dog, washing machine with mechanical brushing and switch operated water spraying to eliminate or reduce the workload of a dog owner or a pet groomer.

It is an object of the present invention to provide an automatic dog washing machine that automatically dry brushes a dog when the water spraying is not turned on It is an object of the present invention to provide an automatic dog washing machine that is capable of brushing most areas of a dog's body automatically.

It is an object of the present invention to provide an automatic dog washing machine that has two sets of brush panels capable of sliding smoothly and reciprocatingly along a dog's body.

It is an object of the present invention to provide an automatic dog washing machine that has two sets of brush panels capable of sliding closely and parallelly to the surfaces of the tub sidewalls without any protruded parts to avoid injury to a pet.

It is another object of the present invention to provide an automatic dog washing machine that has brushes made from long, soft, flexible rubber sticks or fibbers to embrace a dog's body and provide a comfortable brushing without irritating or injuring a pet during a washing.

It is an object of the present invention to provide an automatic dog washing machine that is simple in mechanism and design, has a minimum number of parts, is easy to manufacture and assembly, and affordable when commercialized.

These and other objects, features and advantages will be more clearly understood from the following detailed description taken in conjunction with the accompanying drawings.

DESCRIPTIONS OF PREFERRED EMBODIMENTS

The apparatus in accordance with the invention generally comprises the following components and mechanism, which are contemplated to be employed with all embodiments of the invention disclosed herein: 1) a washing tub for a pet, such as a dog, including a floor with a drain hole and a wastewater compartment beneath it, 2) a mechanical device comprising an electrical motor, pulley and belt or gears, crank sliders including 2 sets of crank wheels or arms, connecting rods, sliders in channels or ball bearing blocks on slide rails, 3) two vertical sidewall panels, each has a horizontal slot, or a notch in which a slider is movable reciprocatingly, 4) a water spray system which includes tubings, connectors, nozzles, water pumps, and a water reservoir, 5) a planar U-shaped cover which protects the mechanical device from water and provides an enclosure to the mechanical device housing, 6) two sets of brush panels longitudinally slidable, each including one or more sections, having long and flexible bristles, and at least one supporting plate which is affixed on a ball bearing block and supports the brush panel.

The washing machine comprises a container, which contains a washing tub for washing and enclosing an animal. Water is sprayed to the dog's body from both sides and collected through a drain on the floor, and stored in a wastewater compartment located between the floor and the bottom of the container. The container is optionally equipped with 4 wheels and can be pushed or pulled carrying a dog and wastewater. The container has an opening at the end of the tub for a dog to enter and exit the tub. The opening is equipped with a closable door. The washing machine has a power switch and a speed knob for the motor, which controls the movement of the brush panels. The washing machine uses water pumps to spray water and drain wastewater from the wastewater compartment. After the washing, an operator turns on the drain pump to remove the wastewater from the wastewater compartment to a drainable area, such as a bucket, a sink, a toilet or an outside ground. The container is also equipped with a drain outlet and a hose with a valve on the outside bottom of the container. Therefore, the wastewater can be drained directly to a ground. Generally, a vaulted cover over the tub is not necessary to contain the water from spray or dog's shaking. However, when a dog's hair is long and its shaking sprays too much water to the surrounding a vaulted cover can be used.

Figure 1:
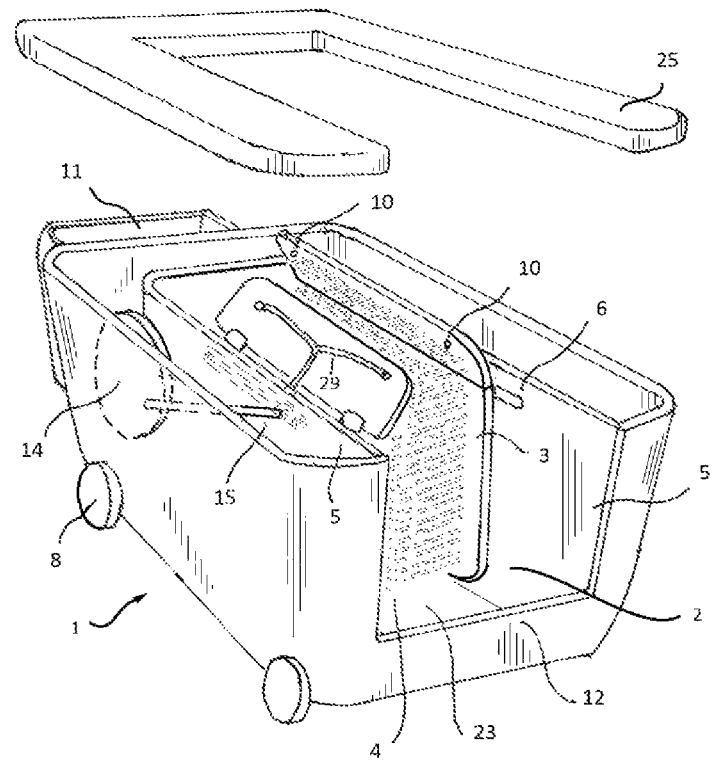
FIG. 1 is a pictorial diagram illustrating the preferred embodiment of the present invention.

A preferred embodiment of the dog washing machine of the invention is shown in FIG. 1. Referring FIG. 1 and FIG. 2, the dog washing and brushing machine 1 includes a washing tub 2, which has an opening entry 12, a cover 25 and 4 wheels 8. The washing machine 1 can be formed from any suitable materials, such as metals, including but not limited to, iron, steel, aluminum, copper, alloys thereof, and plastic or composite materials. In an embodiment, the washing tub 2 includes a brush panel 3 on each side, which is capable of moving horizontally and reciprocatingly to brush a dog's whole body. The brush panel 3 has a bendable top section connected with two hinges, for reaching the back and the neck of the dog. The brush panel 3 is preferably made from light and soft materials, such as plastic or composite materials. Soft and flexible bristles 4, whose diameters and lengths can be changed to conformed to the body shape of a pet, are installed on the brush panels 3. The brush panels 3 are fastened on supporting plates 7. The animal is confined within tub sidewall panels 5, which also prevent water from entering a housing for mechanical device installed between the panels 5 and the washing machine's outside walls. Each of the panels 5 has a longitudinal slot 6 (also in FIG. 4) close to the top edge for transferring mechanical motions from the mechanical device 13 (FIG. 2) to the brush panel 3. A water spray system is assembled in the washing machine 1, including water tubings 29 and spray nozzles 10. The ends of the water tubings 29 and nozzles 10 are affixed on the brush panels 3. The spray nozzles 10 face the dog and spray water to its whole body while the brush panels 3 move reciprocatingly. A portable water tank 11 is attached to the edge of the dog washing machine 1, which serves as a reservoir for detergent solution and clean water.

Figure 2:
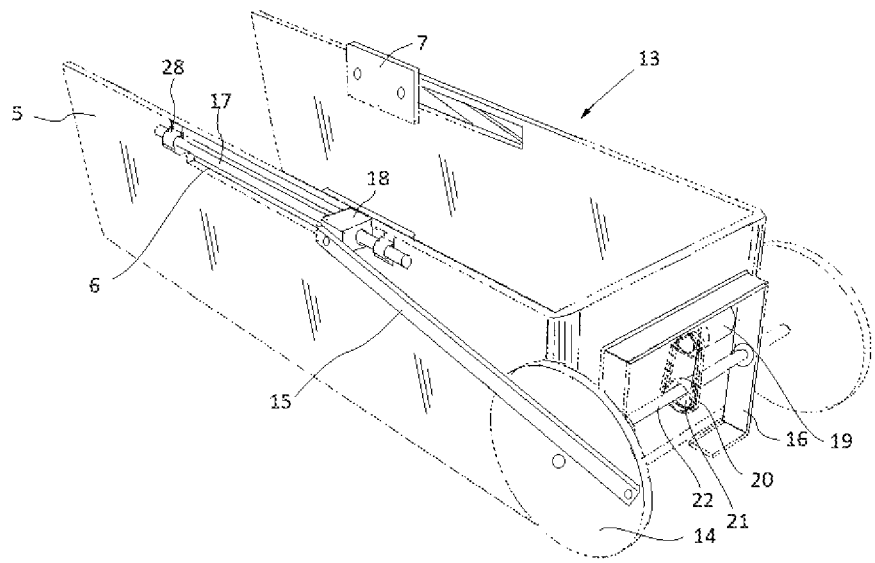
FIG. 2 is a pictorial diagram illustrating the mechanical device of the preferred embodiment of the present invention.
Figure 3:
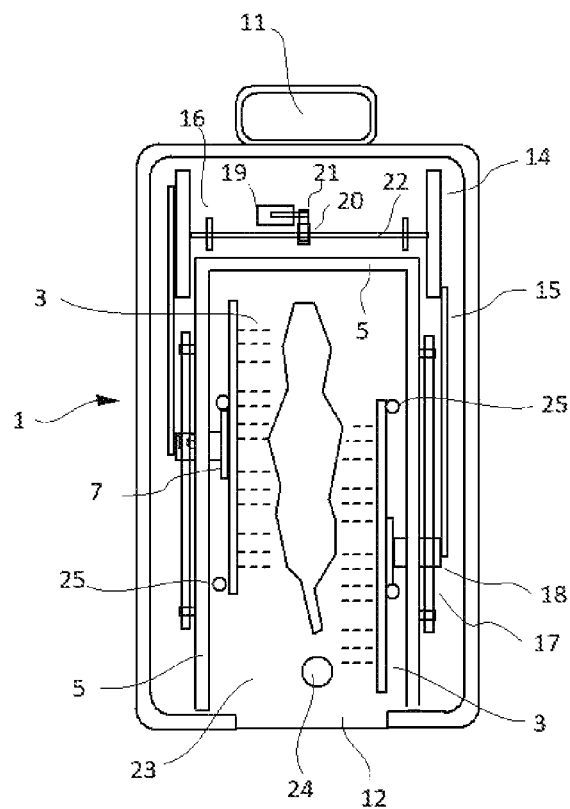
FIG. 3 is a schematic top view of the dog washing machine of the preferred embodiment of the present invention in working.
Figure 4:
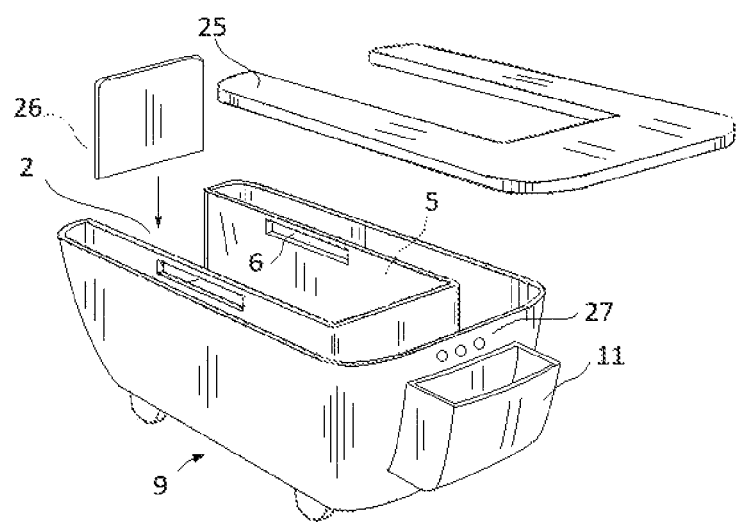
FIG. 4 is a pictorial diagram illustrating a container with a tub inside, a sliding door, a cover and a water tank of the preferred embodiment of the present invention.

Referring FIGS. 2 and 3 the dog washing machine 1 includes a mechanical device 13, which provides a mechanical movement to the brush panels 3. In a preferred embodiment, the mechanical device 13 includes a motor 19, a set of belt 20, pulley 21, and shaft 22, 2 sets of crank wheels 14, connecting rods 15, ball bearing blocks 18 and slide rails 17 positioned on both inner sides of the panels 5. The motor 19, mounted on bracket 16, drives the crank wheels 14 through the belt 20, pulley 21 and shaft 22. The crank wheels 14 pushes and pulls the connecting rod 15, which causes a sliding movement of the ball bearing blocks 18 on the slide rails 17. The rail supports 28 may be mounted on the inner walls of panels 5 or on the inner walls of the container 9 (FIG. 4). Two supporting plates 7 are mounted on the ball bearing blocks 18 and support the brush panels 3. The ball bearing blocks 18 slide in the slots 6 and deliver its reciprocating motion to the brush panels 3.

Referring FIG. 3 the dog washing machine 1 includes a floor 23, which supports a dog, and a drain 24 over the wastewater compartment which is underneath the floor 23. A pair of sliding wheels 25 are vertically installed on the floor 23 on the each side of the tub, between a brush panel 3 and a sidewall panel 5, to reduce the friction of the movement of a brush panel 3.

Referring FIG. 4, the dog washing machine 1 includes a container 9, which has a tub 2 on the centerline and at one end with sidewalls 5. The tub 2 has a sliding door 26 or a hinged door (not shown). On the other end of the container there is a switch panel 27 (location nonspecific) and a water tank 11 detachable on the wall. The container 9 is optionally equipped with 4 wheels 8. A cover 25 encloses the space between the tub sidewalls and the container walls.

In an embodiment, the mechanical device 13 includes crankshafts instead of crank wheels.

In an embodiment, each brush panel is driven by a motor through timing belt and pulley optionally controlled by a motor driver and a controller.

In an embodiment, the mechanical device 13 includes track wheels on tracks instead of ball bearing blocks on rails as the sliders.

In an embodiment, the mechanical device 13 includes a sliding block in a channel as a slider.

In an embodiment, the mechanical device 13 includes a piston in a cylinder as a slider.

In an embodiment, the mechanical device 13 includes a gear system, which drives the slider-crank mechanism.

In an embodiment, the mechanical device 13 is a Whitworth's quick return mechanism, which transfers a motor's rotational force to a reciprocation motion of the brush panels.

In an embodiment, the mechanical device 13 is a Scotch Yoke mechanism, which transfers a motor's rotational force to a reciprocation motion of the brush panels.

In an embodiment, the mechanical device 13 is a cam/follower mechanism, which transfers a motor's rotational force to a reciprocation motion of the brush panels.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

I claim:

1. An automatic washing and brushing machine for dogs and the like, comprising:
    an elongated container, including a bottom, upstanding walls, a tub situated therein at one end, said tub having a floor and an inner wall including two sidewalls, one end wall at one end and an opening at the other end with a closable door; and a mechanical compartment in a space between said inner wall and said upstanding walls of said container, said container having a U-shaped top which encloses said mechanical compartment and sharing said opening with said tub wherein said sidewalls of said tub merges with said upstanding walls of said container;
    a brush panel parallelly and movably suspended on each said sidewall in said tub, each said brush panel being reciprocatingly and horizontally slidable from one end to the other end of said tub for brushing a dog, said brush panel having bristles thereon in spaced rows;
    a mechanical device installed in said mechanical compartment comprising at least one motor, at least two rotary members and at least two sliding members, wherein said rotary members are configured to be mobilized by said motor and convert said motor's rotary motion to reciprocating motions of said sliding members which are connected to said brush panels;
    a slide rail horizontally positioned adjacent to each said sidewall of said tub, said sliding members being slidable on said slide rails along said sidewalls;
    a drain system including a drain on said floor and an outlet on said bottom of said container.

2. An automatic washing and brushing machine as defined in claim 1, wherein each said brush panel has two or more sections, which are bendably connected.

3. An automatic washing and brushing machine as defined in claim 1, wherein each said sidewall has at least one longitudinal slot through which at least one said sliding member is connected to one of said brush panels.

4. An automatic washing and brushing machine as defined in claim 1, wherein said top of said container has at least one longitudinal slot along each said sidewall of said tub through which, at least one said sliding member is connected to one of said brush panels.

5. An automatic washing and brushing machine as defined in claim 1, wherein said container includes a wastewater compartment in the space between said floor and said bottom of said container, said wastewater compartment including a drain pump.

6. An automatic washing and brushing machine as defined in claim 1, wherein said top of said container is an openable cover.

7. An automatic washing and brushing machine as defined in claim 1, wherein each said slide rail is secured inside said mechanical compartment along each said sidewall.

8. An automatic washing and brushing machine as defined in claim 1, wherein said rotary members are mobilized by said motor through pulley and belt.

9. An automatic washing and brushing machine as defined in claim 1, further including a water spray system comprising a water spraying pump, a water tank, water tubings, and sprayers disposed on said brush panels.

10. An automatic washing and brushing machine as defined in claim 1, wherein said container is equipped with 4 wheels.

11. An automatic washing and brushing machine as defined in claim 1, wherein said mechanical device includes a slider-crank mechanism and each said sliding member is at least one ball bearing block.

\* \* \* \* \*